US006709576B2

United States Patent
Jokschas

(10) Patent No.: US 6,709,576 B2
(45) Date of Patent: Mar. 23, 2004

(54) FUEL FILTER WITH WATER DISCHARGE

(75) Inventor: Guenter Jokschas, Murrhardt (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 21 days.

(21) Appl. No.: 09/904,570

(22) Filed: Jul. 16, 2001

(65) Prior Publication Data

US 2002/0050469 A1 May 2, 2002

(30) Foreign Application Priority Data

Jul. 15, 2000 (DE) .......................... 100 34 488

(51) Int. Cl.⁷ .............................................. B01D 35/16
(52) U.S. Cl. ...................... 210/114; 210/248; 210/313; 210/429; 210/440; 210/444
(58) Field of Search .......................... 210/86, 114, 248, 210/312, 313, 429, 440, 444, 457, 305, 453, 455

(56) References Cited

U.S. PATENT DOCUMENTS

| 1,370,425 | A | * | 3/1921 | Garber ..................... 210/422 |
| 2,057,932 | A | * | 10/1936 | Bolser ..................... 210/133 |
| 3,768,659 | A | | 10/1973 | Miller |
| 4,334,989 | A | * | 6/1982 | Hall ........................ 210/114 |
| 5,599,460 | A | * | 2/1997 | Van Schoiack et al. ..... 210/746 |
| 5,698,098 | A | * | 12/1997 | Ernst et al. ............... 210/248 |

FOREIGN PATENT DOCUMENTS

| DE | 3701259 | 7/1987 |
| DE | 9211438.5 | 2/1994 |
| DE | 19804549 | 8/1999 |
| GB | 2129329 | 5/1984 |

* cited by examiner

Primary Examiner—Matthew O. Savage
(74) Attorney, Agent, or Firm—Crowell & Moring LLP

(57) ABSTRACT

A fuel filter 10, particularly for diesel fuel, which is formed by a filter housing 11 with a filter head 12 and a filter enclosure 13. The filter head 12 has a fuel inlet 14 and a fuel outlet 15. The housing enclosure 13 has a water accumulation chamber 25, which is connected to a water outlet 16. A cylindrical filter element 17 and a water discharge device 27 are arranged in the filter housing 11. The filter element 17 separates an unfiltered side 19 from a filtered side 20 so as to form a seal. The water discharge device 27 seals the water outlet 16 in the housing enclosure 13. The water outlet 16 can be mechanically opened from the outside via an actuating element 29, which is is appropriately connected to the filter head 12 on the one hand and to the water outlet 16 on the other hand.

8 Claims, 3 Drawing Sheets

FUEL FILTER WITH WATER DISCHARGE

BACKGROUND OF THE INVENTION

The invention relates to a fuel filter with an internal water accumulation chamber which communicates with a water outlet provided in the filter housing enclosure and a water discharge valve arranged at the water outlet.

DE 198 04 549 discloses a fuel filter, particularly for diesel fuel, which is formed by a filter housing with an inlet connection and an outlet connection. Inside the housing, a filter element is arranged, which separates an unfiltered side from a filtered side to form a seal. In the lower part of the housing, a water collection chamber is provided to take up water removed from the fuel. A water sensor protrudes into this water collection chamber. The water may be removed from the water collection chamber via a valve that is externally actuated by mechanical means and opens or closes a water outlet. The valve is arranged on the housing floor and is actuated by a cable assembly, which is disposed outside the filter housing in the area of the housing floor.

The disadvantage of this embodiment is that the valve requires space outside the filter housing. The space available to install a fuel filter in a motor vehicle is limited and is generally substantially filled by the filter housing. In addition, the cable assembly needs a moving mechanism, which also requires installation space. Furthermore, the valve is formed by many separate parts, which makes it costly to produce.

SUMMARY OF THE INVENTION

It is the object of the invention to provide a fuel filter with a water outlet.

Another object of the invention is to provide a fuel filter which can be installed in a small installation space.

A further object of the invention is to provide a fuel filter with a water discharge which can be manufactured economically.

These and other objects have been achieved in accordance with the present invention by providing a fuel filter suitable for filtering diesel fuel comprising a filter housing comprising a filter head and a housing enclosure, a fuel inlet and a fuel outlet arranged on the filter housing, and a water accumulation chamber which communicates with a water outlet provided in the housing enclosure, a cylindrical filter element installed in the filter housing such that an unfiltered side of the filter which communicates with the fuel inlet is sealingly separated from a filtered side of the filter which communicates with the fuel outlet, and a water discharge valve at the water outlet with an actuator for opening the water discharge valve from outside the filter, wherein the actuator is connected to the filter head on the one hand and the water outlet on the other hand.

The fuel filter according to the invention serves to clean a fuel, particularly diesel fuel, in which the water contained in the fuel is separated. To this end, the fuel filter has a filter housing with a filter head and a housing enclosure. The housing parts are connected to one another either permanently, for instance by crimping, or detachably, for instance by a threaded connection. A fuel inlet and a fuel outlet are provided on the filter housing. In special embodiments, the fuel inlet and the fuel outlet are arranged in the filter head. The housing enclosure contains a water accumulation chamber in which the separated water can collect. On the housing enclosure, particularly in the area of the water accumulation chamber, a water outlet is arranged, so that the water accumulation chamber is appropriately connected to the water outlet. The water outlet can be arranged at any location within the housing enclosure. Advantageously the water outlet is disposed at the lowest point of the housing enclosure, so that the water, which collects at the bottom of the enclosure, is very simple to remove from the fuel filter.

The fuel filter comprises a cylindrical filter element with a filter medium. The filter medium can, for instance, be a filter paper or a nonwoven web of filter material. This filter medium can be folded, rolled, or flat. The filter element is introduced into the filter housing such that it separates an unfiltered side from a filtered side and forms a seal. The unfiltered side is connected to the fuel inlet and the filtered side to the fuel outlet. When the filter element is dirty, either the filter element only or the entire fuel filter can be replaced depending on how the filter housing is configured.

The fuel filter further contains a water discharge valve by means of which the water outlet in the housing enclosure can be mechanically opened from the outside via an actuating element. This actuating element is correspondingly connected to the filter head on the one hand and the water outlet on the other hand. The actuating element extends inside the fuel filter, so that no interfering elements are arranged on the outside of the fuel filter. This has the advantage that the fuel filter can be installed in even small and poorly accessible spaces. Further, the water discharge device comprises a sealing element, which can tightly seal the water outlet and which is correspondingly connected to the actuating element and to a moving mechanism by means of which the actuating element can be moved. The moving mechanism can for instance be a pull handle, a lever, a push button, or a ring.

As soon as a certain amount of water has collected in the water accumulation chamber, the moving mechanism is mechanically moved from the outside. This causes the actuating element and the sealing element to move and the water outlet to be unblocked. The actuating element can be moved in a linear or rotary motion. After the water has been removed, the sealing element closes the water outlet again. The point in time when the sealing element closes the water outlet again may be controlled from the outside, e.g., depending on how long the moving mechanism is held in open position. It is also possible, however, to define a time basis that cannot be controlled from the outside or a variable time basis that controls the moving mechanism as a function of environmental influences.

In accordance with a further embodiment of the invention, a water sensor is arranged within the filter housing. This water sensor can be arranged at any point within the filter housing. In a special variant the water sensor is arranged on the enclosure floor or in the filter head. The water sensor is used to determine exactly the time when the water has to be removed from the fuel filter. This eliminates the need to inspect the water level in the fuel filter.

In an advantageous embodiment of the invention, the actuating element extends through a filter interior formed by the cylindrical filter element. This makes it possible to arrange the actuating element at the top of the filter housing and thus simplifies operation. It is advantageous if the water outlet and the actuating element are arranged coaxially to the center axis of the fuel filter. In this embodiment, the actuating element extends through both the filtered side and the unfiltered side, so that suitable measures must be taken to prevent leakage along the actuating element between the unfiltered side and the filtered side. Such suitable measures for preventing leakage include, for example, gaskets connected to the filter element and the actuating element to form a seal. However, the filter element may also be configured in such a way that it fits tightly against the actuating element to form a seal so that any leakage is avoided. However, the actuating element must still be capable of being moved.

It is advantageous that the water outlet can be opened by an axial movement of the actuating element. The actuating element may be embodied as a push rod, which lifts the sealing element from the water outlet and allows the water to flow out. The sealing element, which seals the water outlet from the outside, is pressed against the water outlet with a sufficient biasing force so that the water outlet cannot be opened by excessive internal pressure.

In accordance with a further embodiment of the invention, the water outlet can be opened by pulling on the actuating element. The actuating element is configured in such a way that it can transmit pulling forces. It can for instance be a pull rod or a cable. In this embodiment the sealing element can be arranged in the interior of the fuel filter and be pressed against the water outlet by the liquid in the fuel filter. In this case, only a slight axial movement of the actuating element is required to open the water outlet. The pulling force can for instance be manually applied to the actuating element.

An advantageous variant of the invention provides for a drive unit to produce the axial movement of the actuating element. The actuating element can be moved by a lever mechanism, particularly a rocker or toothed gear. In a lever mechanism, several levers may be used to translate an introduced force into an axial movement. A fixed support point can serve as a reversing point for the introduced force so that, for instance, a pressure force is translated into a pulling force. The drive unit may also be configured as a transmission gear, which translates a small movement of the moving mechanism into a larger movement of the actuating element or a large movement of the moving mechanism into a small movement of the actuating element. In toothed gearing, the actuating element can have a toothed rack or a toothed wheel, while the actuating element is driven by an additional toothed wheel. Depending on the embodiment, the actuating element moves axially or radially. This provides great freedom of design for optimal adaptation to the site of use of the filter.

In accordance with a further embodiment of the invention, the drive unit can be locked. In this case, the drive unit is provided with an arresting element, which in the engaged state prevents any uncontrolled movement of the drive unit and thus any uncontrolled opening of the water outlet. In the disengaged state, the drive unit can be moved to move the sealing element away from the water outlet and allow accumulated water to escape.

A specific embodiment of the invention provides that the water outlet can be opened and closed automatically, in which case the water discharge device is controlled. One possibility for automation is to connect the water sensor with the actuating element, so that the water can be drained without the intervention of an operator. The water sensor signals, for instance, that the water has exceeded a defined filling level. This causes the actuating element to be moved in its position by the drive mechanism and the sealing element to unblock the outlet opening. After the water falls below a defined minimum filling level, which is defined in such way that no fuel will reach the water outlet, the actuating element is moved back into its closed position, so that the sealing element again seals the water outlet. This reduces manual maintenance.

These and other features of preferred embodiments of the invention, in addition to being set forth in the claims, are also disclosed in the specification and/or in the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
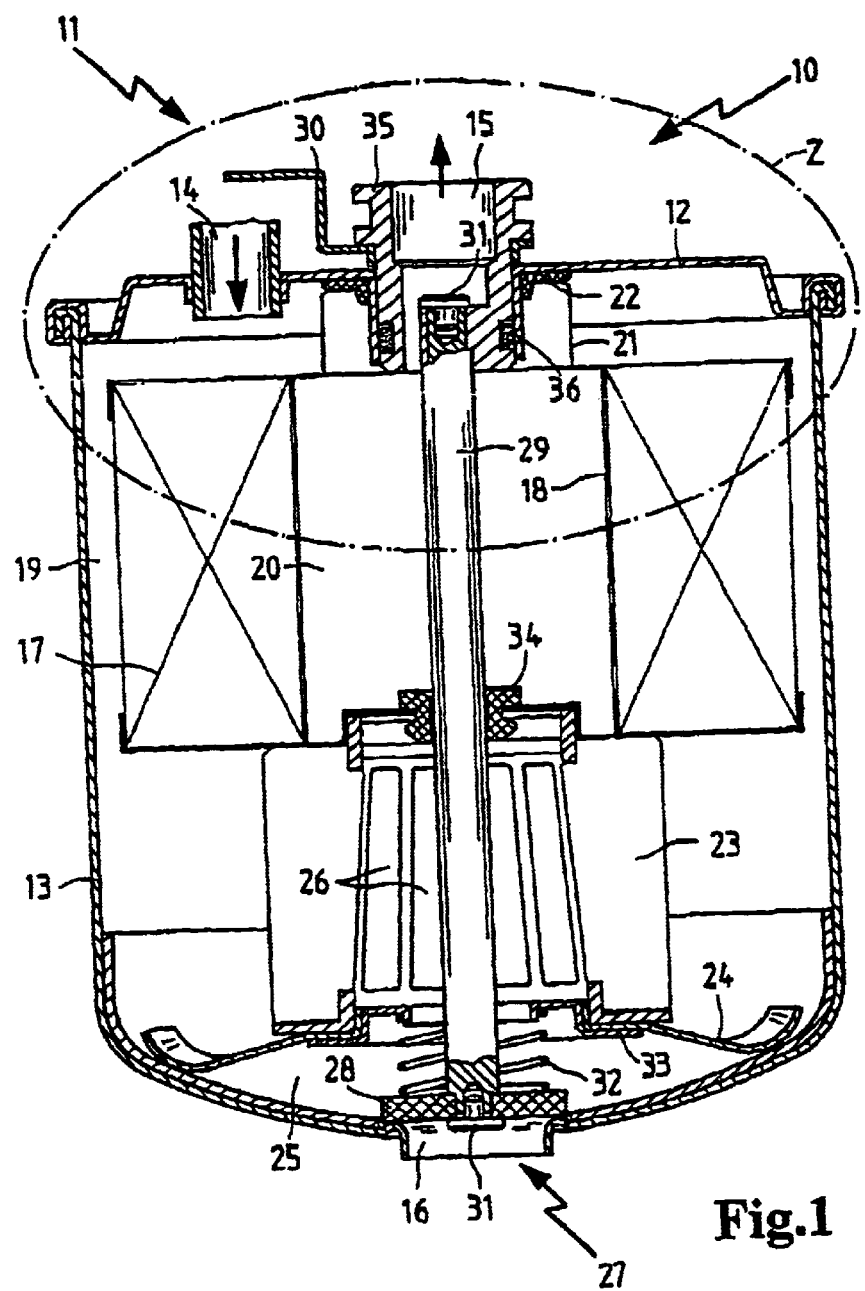
FIG. 1 shows a cross-sectional view of a first fuel filter embodiment according to the invention.

FIG. 1 shows a fuel filter 10 in cross section. Fuel filter 10 has a filter housing 11, which is formed by a filter head 12 and a housing enclosure 13. The filter head 12 in this example is crimped together with the housing enclosure 13 to form a seal. In other embodiments, however, detachable connections between the filter head 12 and the housing enclosure 13 are also feasible. The filter head 12 has a fuel inlet 14 and a fuel outlet 15. The housing enclosure 13 has a centrally arranged water outlet 16 in the bottom thereof.

A cylindrical filter element 17 folded in pleated or zigzag shape is inserted into the housing enclosure 13. In this embodiment, the fuel flows radially through the filter element 17 from the outside toward the inside. To prevent the filter element 17 from being deformed as the fuel flows through it, a support tube 18 is provided, against which the filter element 17 is braced. The housing enclosure 13 encloses an unfiltered side 19, which is separated from the filtered side 20 by the filter element 17 forming a seal. The unfiltered side 19 is appropriately connected to the fuel inlet 14 and the filtered side 20 to the fuel outlet 15.

An upper spacer 21 that supports the filter element 17 against the filter head 12 fixes the position of the filter element 17 within the filter housing 11. To prevent leakage between the unfiltered side 19 and the filtered side 20 in this area, a seal 22 is inserted between the upper spacer 21 and the filter head 12. The fuel filter 10 further has a lower spacer 23 which is braced against the housing enclosure 13 via an intermediate metal plate 24.

Within the housing enclosure 13 a water accumulation chamber 25 is arranged on the unfiltered side 19. The water collects in front of the filter element 17 on the unfiltered side 19 and flows downward. The lower spacer 23 has gaps 26 through which the water can reach the water accumulation chamber 25.

The fuel filter 10 has a water discharge valve 27 which is arranged on the cylinder axis and is provided with a annular sealing element 28, an actuating element 29 and a moving mechanism or drive unit 30. The sealing element 28 seals the water outlet 16 in the closed position and is connected to the actuating element 29 by a rivet 31. The sealing element 28 is pressed against the water outlet by a helical compression spring 32. The helical spring 32 is supported against a metal support plate 33. The metal support plate 33 contacts the intermediate metal plate 24. The actuating element 29 extends coaxially to the cylinder axis of the housing and penetrates the lower spacer 23, the filter element 17, and the upper spacer 21. Since the actuating element 29 is in contact with both the unfiltered side 19 and the filtered side 20, a molded seal 34 is provided, which is connected to the filter element 17 and the actuating element 29 to form a seal. The actuating element 29 is axially displaceable in molded seal 34 however. On the end of the actuating element 29 opposite the sealing element 28, an end fitting 35 is connected to the actuating element 29 by a rivet 31. The end fitting 35 protrudes into the filter head 12 and is configured in such a way that it encloses the fuel outlet 15 and is connected to the moving or drive mechanism 30, so that the end fitting 35 can be moved axially. To prevent fuel from leaking between the end fitting 35 and the filter head 12, a sealing ring 36 is arranged on the end fitting 35.

To open the water outlet 16, the moving mechanism 30 must be pulled upwardly in axial direction. This causes the end fitting 35, the actuating element 29, and the sealing element 28 to be moved axially in upward direction and the water outlet to be unblocked. As soon as the pulling force is no longer applied to the moving mechanism 30, the helical spring 32 again presses the sealing element 28 against the water outlet 16 and seals it.

Figure 2:
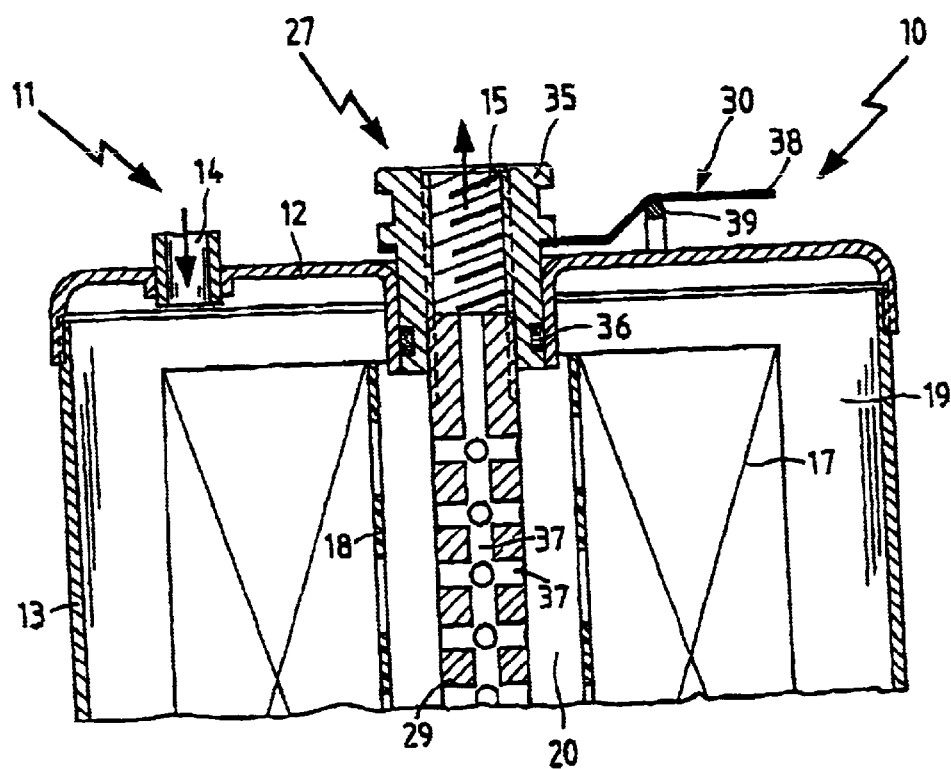
FIG. 2 shows a detail view of FIG. 1 within the circle Z.

FIG. 2 shows a detail Z of FIG. 1 in cross section. Here the water outlet 27 and the filter housing 11 are shown in a different configuration. Components that correspond to those of FIG. 1 carry identical reference numbers. The filter housing 11 is formed by a filter head 12 and a housing enclosure 13. The two housing parts 12, 13 are detachably screwed together. In this embodiment the actuating element 29 is provided with fuel ducts 37 in the area of the filtered side 20 through which the filtered fuel can reach the fuel outlet 15. The actuating element 29 is screwed into the end fitting 35, so that the axial movement is transmitted. The moving mechanism 30 is embodied as a lever mechanism with a lever 38 connected to the end fitting 35. The moving mechanism 30 further has a support point 39 against which the lever 38 rests. Pushing against the end of the lever causes the pressure force to be redirected and the actuating element 29 to be moved axially in upward direction. As soon as the pressure on the lever is released, the helical spring 32 (not shown) pulls the actuating element 29 again in downward direction as described in FIG. 1.

Figure 3:
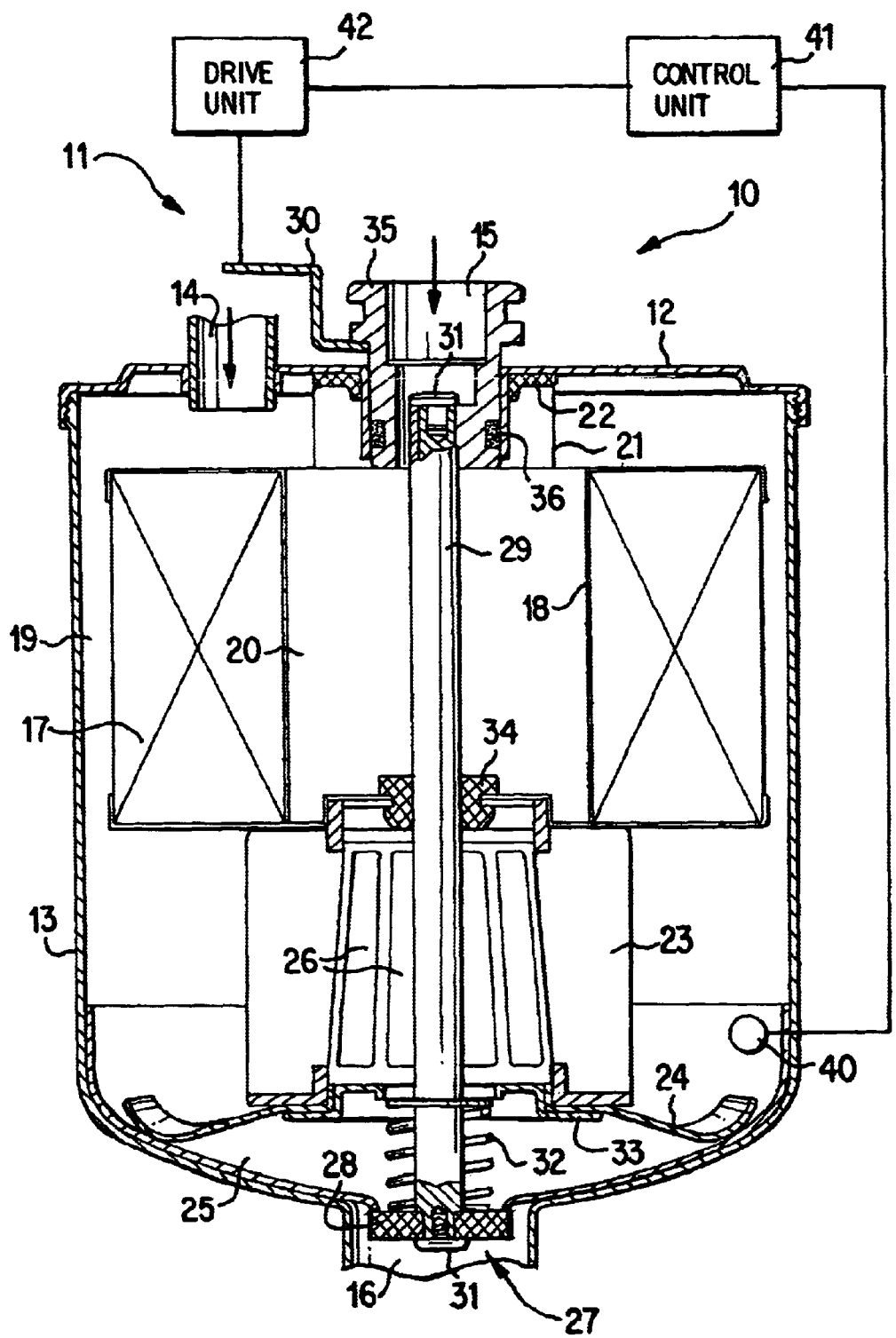
FIG. 3 is a cross sectional view of an alternate embodiment of the fuel filter of the invention with an automated water discharge mechanism.

FIG. 3 shows an alternate embodiment of the fuel filter of the invention in which like parts are designated by the same reference numerals used to identify corresponding parts in the embodiment of FIG. 1. In FIG. 3, the sealing member 28 of water discharge valve 27 is arranged on the outside of housing enclosure 13, which is detachably joined to the filter head 12 by a threaded connection. Spring 32 is compressed between a spring support on actuator 29 and housing enclosure 13 and urges the seal member 28 against the water outlet opening 16 to close the water discharge valve 27. The water discharge valve 27 is opened by pushing down on actuator 29 against the force of the spring 32. A water sensor 40 is provided adjacent water accumulation chamber 25 to sense when the chamber is filled with water. When sensor 40 senses that the water has reached a predetermined level, it send a signal to control unit 41, which in turn activates drive unit 42 to push down on actuator 29 and automatically open the water discharge valve 27 without the need to human inspection of the water level or manual actuation of actuator 29. In other respects the embodiment of FIG. 3 corresponds to the embodiment of FIG. 1.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A fuel filter suitable for filtering diesel fuel comprising:
   a filter housing comprising a filter head and a housing enclosure, a fuel inlet and a fuel outlet arranged on the filter housing, and a water accumulation chamber which communicates with a water outlet provided in the housing enclosure,
   a cylindrical filter element installed in the filter housing such that an unfiltered side of the filter which communicates with the fuel inlet is sealingly separated from a filtered side of the filter which communicates with the fuel outlet, wherein the water accumulation chamber is disposed on the unfiltered side of the filter,
   a lower spacer including gaps through which water reach the water accumulation chamber,
   an intermediate metal spring plate cooperating with the housing to brace the lower spacer against the filter insert,
   a water discharge valve at said water outlet, with an actuator for opening the water discharge valve from outside the filter, and
   wherein said actuator is connected to the filter head on the one hand and the water outlet on the other hand.

2. A fuel filter according to claim 1, further comprising a water sensor arranged in the filter housing.

3. A fuel filter according to claim 2, wherein the water sensor is connected to a control unit, which in turn is connected to a drive unit for said actuator, such that the actuator is actuated and the discharge valve opened automatically to release water from the filter housing when the water sensor senses that a predetermined amount of water has accumulated in the water accumulation chamber.

4. A fuel filter according to claim 1, wherein said actuator extends through a filter interior formed by the cylindrical filter element.

5. A fuel filter according to claim 1, wherein axial displacement of the actuator opens the water outlet.

6. A fuel filter according to claim 5, wherein the water outlet is opened by pulling on the actuator.

7. A fuel filter according to claim 5, further comprising a drive unit for moving said actuator.

8. A fuel filter according to claim 7, further comprising means for arresting said actuator to prevent unintended opening of the discharge valve.

* * * * *